United States Patent
Verhaeghe

(10) Patent No.: US 10,338,088 B2
(45) Date of Patent: Jul. 2, 2019

(54) BALING CHAMBER SENSOR

(71) Applicant: CNH Industrial America LLC, New Holland, PA (US)

(72) Inventor: Didier Verhaeghe, Ieper (BE)

(73) Assignee: CNH Industrial America LLC, New Holland, PA (US)

(*) Notice: Subject to any disclaimer, the term of this patent is extended or adjusted under 35 U.S.C. 154(b) by 554 days.

(21) Appl. No.: 15/067,478

(22) Filed: Mar. 11, 2016

(65) Prior Publication Data

US 2016/0270296 A1 Sep. 22, 2016

(30) Foreign Application Priority Data

Mar. 16, 2015 (BE) .................................. 2015/5152

(51) Int. Cl.
*G01P 3/00* (2006.01)
*A01F 15/08* (2006.01)
*A01F 15/10* (2006.01)

(52) U.S. Cl.
CPC ............ *G01P 3/00* (2013.01); *A01F 15/0825* (2013.01); *A01F 15/101* (2013.01); *A01F 2015/102* (2013.01)

(58) Field of Classification Search
CPC ...... A01F 15/10; A01F 15/0825; A01F 15/04; A01F 15/042; A01F 15/101; A01F 2015/102
USPC ............................................. 100/179, 188 R
See application file for complete search history.

(56) References Cited

U.S. PATENT DOCUMENTS

| 4,569,282 A * | 2/1986 | Galant ................... A01F 15/04 100/189 |
| 4,730,446 A * | 3/1988 | van der Lely .......... A01F 15/07 100/88 |
| 5,768,872 A * | 6/1998 | Von Allworden ..... A01D 90/02 100/189 |
| 6,105,353 A * | 8/2000 | Mohr ................... A01F 15/0841 475/153 |
| 6,546,705 B2 * | 4/2003 | Scarlett ................... A01F 15/00 56/10.2 R |
| 7,104,191 B1 * | 9/2006 | Parker ................. A01F 15/0825 100/41 |
| 8,800,255 B2 | 8/2014 | Posselius et al. |
| 2002/0108508 A1 * | 8/2002 | Leupe ................. A01F 15/0825 100/45 |
| 2005/0235841 A1 * | 10/2005 | Hel ........................ A01F 15/042 100/43 |

(Continued)

FOREIGN PATENT DOCUMENTS

| WO | 2012092313 A1 | 7/2012 | |
| WO | WO 2013124227 A1 * | 8/2013 | .......... A01F 15/101 |
| WO | WO 2014005882 A1 * | 1/2014 | .......... A01F 15/101 |

*Primary Examiner* — Shelley M Self
*Assistant Examiner* — Jared O Brown
(74) *Attorney, Agent, or Firm* — Patrick M. Sheldrake; Peter K. Zacharias

(57) ABSTRACT

A first and a second bale speed sensor are provided in a segment of the baling chamber of an agricultural baler. The first sensor is positioned at an upper part, while the second sensor is positioned at a lower part of the baling chamber. Respective outputs of said bale speed sensors being operationally connected to a controller which is adapted to adjust based on said outputs a synchronization between the periodically forming and pushing of a slice of crop material and the reciprocal movement of the plunger.

16 Claims, 3 Drawing Sheets

(56) References Cited

U.S. PATENT DOCUMENTS

| | | | |
|---|---|---|---|
| 2012/0000377 A1* | 1/2012 | Verhaeghe | A01F 15/0825 100/45 |
| 2012/0240797 A1* | 9/2012 | Verhaeghe | A01F 15/0825 100/43 |
| 2013/0000496 A1* | 1/2013 | Posselius | A01F 15/0825 100/40 |
| 2015/0027325 A1* | 1/2015 | Bonte | A01F 15/0841 100/35 |
| 2015/0373918 A1 | 12/2015 | Coen et al. | |
| 2017/0265398 A1* | 9/2017 | Retzlaff | A01F 15/0841 |
| 2017/0273248 A1* | 9/2017 | Retzlaff | A01F 15/0875 |

* cited by examiner

BALING CHAMBER SENSOR

This application claims priority to Belgium Application BE2015/5152 filed Mar. 16, 2015, which is incorporated herein by reference in its entirety.

FIELD OF THE INVENTION

The present invention relates to an agricultural baler. Preferably the present invention relates to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales, being a pre-compression chamber and a baling chamber. Crop material is gathered and pushed into the pre-compression chamber, where a slice of crop material is formed. Pre-compression chamber is linked to the baling chamber in such a manner that the slice of crop material can periodically be transferred into the baling chamber. In the baling chamber, a plunger reciprocally moves, thereby pressing a square bale from subsequently feeded slices.

The plunger movement is powered via a main shaft driven by a motor. Thereby, the motor can be a part of the baler, or can be a part of e.g. the tractor connected to the baler via a power take-off (PTO). In practice, this reciprocal movement of the plunger is often considered the most dominant movement in the baler, dominant meaning that other movements are made relative to this movement of the plunger. The reason is that the plunger movement requires the highest force (highest relative to other forces needed for operating the baler). Off all movements in the baler, the movement of the plunger shows the highest inertia.

The pre-compression chamber is adapted for receiving gathered crop material. To this end, the pre-compression chamber shows an inlet. The pre-compression chamber furthermore shows an outlet towards the baling chamber. Between the inlet and the outlet, a channel is defined in which crop material can gather into a slice of crop material. The pre-compression chamber comprises a slice pushing mechanism provided for pushing a slice of crop material formed in the pre-compression chamber through the outlet of the pre-compression chamber into the baling chamber. The sliced crop material is typically pushed in a first segment of the baling chamber. First segment is typically located directly behind the plunger (the plunger being in the withdrawn position). Thereby the slice of crop material is pushed in the baling chamber, after which the plunger can propel the crop material into the baling chamber, thereby pushing the most recently entered slice into the baling chamber, making it a part of the square bale.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyer belts in between which the slice is formed, and which conveyer belts are driven to push the slice through the outlet.

The slice pushing mechanism is driven via a driving mechanism that is operationally linked to the plunger driving mechanism. A synchronized movement between the slice pushing mechanism and the plunger is needed to ensure a proper operation of the baler. Namely, only when the plunger is withdrawn, a slice can be pushed in the baling chamber. In practice, different synchronization types are possible among which a one/one synchronization, meaning that every withdrawal of the plunger a new slice is entered into the baling chamber, or a one/two synchronization, meaning that every other withdrawal of the plunger a new slice is entered, thus the plunger moves forth and back two times for each slice. Other synchronization timing such as one/three, one/four, . . . are also possible.

Synchronization is in practice realized by mechanically linking the plunger driving mechanism and the slice pushing driving mechanism. Such mechanical link ensures proper synchronization, as the slice pushing mechanism is mechanically driven by the plunger movement, it cannot move out of synchronization.

A drawback relates to so called top fill. Top fill is a measure for the uniformity of the slice after it has entered the first segment of the baling chamber. It will be recognized that a non-uniform fill, for example where the lower part of the first segment is more dense than an upper part, results in an inferior bale. Such top fill has an effect that a bale is high dense at the lower end, and not dense at the top, resulting in an unstable bale that is likely to show a substantial deviation from the ideal square form. Such bale will bend like a banana resulting in a weirdly shaped bale. A negative top fill also results in a substantial wear of the plunger and baling chamber, as forces are not equally transmitted. The plunger will feel a substantially high resistance at the lower part of the plunger compared to the upper part resistance of the plunger. This will create a torque force exerted to the plunger which has to be borne by the plunger driving mechanism. When the ideal top fill can be obtained, a bale can be formed with nearly ideal outer dimensions and shape, and excessive wear on the baler mechanism can be avoided. In prior art balers, the ideal top fill is obtained by controlling the slice forming process in the pre-compression chamber. By obtaining a slice in which the crop material is evenly spread over the slice, after which the slice is pushed into the baling chamber, an acceptable top fill can be obtained.

A drawback of the existing top fill controlling mechanisms is that a deviation of the top fill can still occur depending on the baling speed and the type of crop material (hay, straw, silage, . . . ).

SUMMARY OF THE INVENTION

It is an object of the present invention to provide a baler where top fill is controllable in a more accurate manner.

To this end, the invention provides an agricultural baler comprising a baling chamber and a pre-compression chamber, wherein the pre-compression chamber is adapted to gather crop material and to periodically form a slice of said crop material and push the slice towards the baling chamber into a first segment of the baling chamber, the baling chamber comprising a plunger provided for reciprocally moving in the baling chamber thereby compressing slices of crop material into a bale, wherein a first and a second bale speed sensor are provided in a further segment of the baling chamber, the first at an upper part and the second at a lower part of the baling chamber, respective outputs of said bale speed sensors being operationally connected to controller which is adapted to adjust a synchronization between the periodically forming and pushing and the reciprocal movement.

Because the first and the second sensor are placed in one segment (the further segment), and the first is placed in a lower region and the second is placed in a higher region, a speed difference can be detected by the sensors. Such speed difference is indicative for a deviation in bale density between the location of the first sensor and the location of the second sensor. Because the sensors are spread over the height of the baling chamber, the measurement is indicative for a deviation in bale density over the bale height. Practical tests have shown that such deviation in bale density over the bale height is very often the result of a non-optimal top fill. Thereby, by measuring this deviation, the top fill can be determined by the controller and adjustments can be suggested. The controller is provided to adjust the synchronization between the reciprocal movement of the plunger and the forming and pushing of the pre-compression chamber, based upon the respective outputs of the first and second sensor. Thereby, a mechanism to optimize top fill in the baling chamber is provided by adjusting synchronization timing of the slice in the baling chamber with respect to the plunger movement.

Preferably the controller is adapted to adjust the synchronization timing of the periodically forming and pushing of the pre-compressing chamber with respect to the reciprocal movement of the plunger. Since the reciprocal movement of the plunger is typically considered the dominant movement in the baler, adjustments are preferably made to the pre-compression chamber operation. By adjusting the timing of synchronization, synchronization is fine-tuned depending on the measurement of the sensor.

Preferably, the further segment has a width smaller than 30 cm, preferably smaller than 20 cm, more preferably smaller than 10 cm. The result is that the bale speed sensors are located in a rather small segment thereby making the measured bale speeds highly comparable. Since compression and resilience are constantly at work inside the baling chamber, performing the measurements in a small segment is advantageous for comparing purposes.

Preferably, the first and the second bale speed sensor are mounted in the baling chamber at substantially the same distance from the plunger. By providing the sensors at the same distance from the plunger, the impact (relating to bale density) of the plunger on the bale can be considered as being identical thereby making the sensor outputs highly comparable.

Preferably the first and second bale speed sensors are chosen from star wheel sensors, resistance sensors, ultrasonic sensors and optical sensors. Thereby, the first and second sensor are preferably identical so that comparing is made easy. Star wheel sensors and resistance sensors are known for providing a reliable bale speed measurement and for providing an indication regarding bale density. Ultrasonic and optical sensors are known for providing a highly accurate speed measurement even in dusty environments and even when the measured object has irregular surface characteristics.

Preferably, the pre-compression chamber comprises an inlet and an outlet, the baler comprising a feeder for feeding crop material in to said inlet, wherein said outlet opens towards said first segment, said pre-compression chamber comprising a pushing mechanism for pushing said slice through said outlet into said baling chamber, whereby said controller is provided for controlling the timing of said pushing mechanism. Such pre-compression chambers are known to the skilled person. Therefore it is easy for a skilled person to control such known pre-compression chamber with the controller thereby adjusting the timing of the pushing mechanism based on the sensor.

Preferably the pre-compression chamber comprises two conveyors defining a channel between the inlet and the outlet, the two conveyors being provided to form said slice and to act as said pushing mechanism. Typically the two conveyors are driven by hydraulic or electric motors. The latter can be steered by the controller to adjust timing, particularly of the pushing action of the conveyors. In this manner, the timing of arrival of the slice in the baling chamber can be influenced by adjusting the conveyor timing.

Preferably, as an alternative to the conveyor embodiment described above, the pushing mechanism is formed as a set of fingers provided for grasping behind the slice of crop material at the inlet of the pre-compression chamber and for pushing the slice through the outlet by moving the fingers towards the outlet. Such pushing mechanism proved to be an efficient and well controllable mechanism for transferring a slice of crop material formed in a pre-compression chamber into the baling chamber.

Preferably the plunger driving mechanism is mechanically connected to a slice pushing driving mechanism to synchronize the latter, the mechanical connection comprising an intermediary element steerable via said controller. In prior art balers, a mechanical connection is often provided between the plunger driving mechanism and the slice pushing driving mechanism. This mechanical connection ensures a correct synchronized movement between the plunger and the crop pushing mechanism. This prevents the crop pushing mechanism from pushing a slice of crop material into the baling chamber if the baling chamber is not ready to receive the slice crop material (for example when the plunger is in its extended position thereby closing off the first segment of the baling chamber). By providing a coupling element in the mechanical connection, the synchronization timing can be adjusted. Thereby, the synchronization can be fine-tuned meaning that the moment of arrival of the slice of crop material into the first segment of the baling chamber can be somewhat shifted. Thereby, the mechanical connection is maintained ensuring a correct synchronization (in the broad sense of synchronization) while enabling the controller to adjust the synchronization (thereby obtaining a fine-tuned synchronization).

Preferably the intermediary element is formed as a planetary gearbox. A planetary gearbox is known for linking three rotational movements (respectively via the center gear, the planet gears and the ring gear). Therefore the planetary gearbox can be used in the present case to link the plunger driving mechanism, the slice pushing driving mechanism, and the controller. Thereby, when the controller stands still, there is a constant predictable link between rotational speed of the plunger driving mechanism and the slice pushing driving mechanism, meaning that the relative movement of one with respect to the other is fixed. Thereby, because of the fixed relative movement, the synchronization timing is also fixed. By operating the controller, connected to the planetary gearbox, the relative position of the plunger driving mechanism and the slice pushing driving mechanism changes. Thereby, synchronization optimization is made possible. A skilled person can, based on the principles explained in this disclosure, test and/or determine several planetary gearbox constructions, and can test and/or determine the influence of the controller to the synchronization timing.

Preferably, the intermediary coupling element is formed as a two part gearbox, the first part connecting one end via straight gear coupling, the second part connecting the other end via a helical gear coupling. Such two part gearbox is known in the art for amending the relative position of two shafts while connecting the shafts in a rotational movement. When the two part gearbox is in a fixed position, the two shafts are directly connected to one another. Thereby, rotational movement and forces can be transmitted from one shaft to another. By displacing the gearbox along its longitudinal axis, the relative position of the two shafts is amended. This is because the one end (via the straight gear coupling) remains its axial position with respect to the shaft connected to that one end, while the axial position of the second part (connected via the helical gear coupling) is changed with respect to the second shaft connected to that other end. Thereby, synchronization can be adjusted and amended synchronization timing can be obtained via such two part gearbox.

Preferably the intermediary coupling element is adapted to adjust the relative position of the plunger driving mechanism and the slice pushing driving mechanism. By adjusting the relative position of the plunger driving mechanism and the slice pushing driving mechanism, the timing is adjusted. Preferably an actuator is connected to the intermediary coupling element to control the latter.

Preferably at least one further bale speed sensor is provided in the further baling chamber segment, an output of which is operationally connected to said controller. By providing multiple bale speed sensors over the height of the baling chamber segment, a more detailed speed deviation can be measured thereby giving a more detailed insight in the bale density over the height. This insight can be used to further analyze the top fill in order to obtain a faster or better correction of synchronization thereby aiming for the optimal top fill.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF PREFERRED EMBODIMENTS

Figure 1:
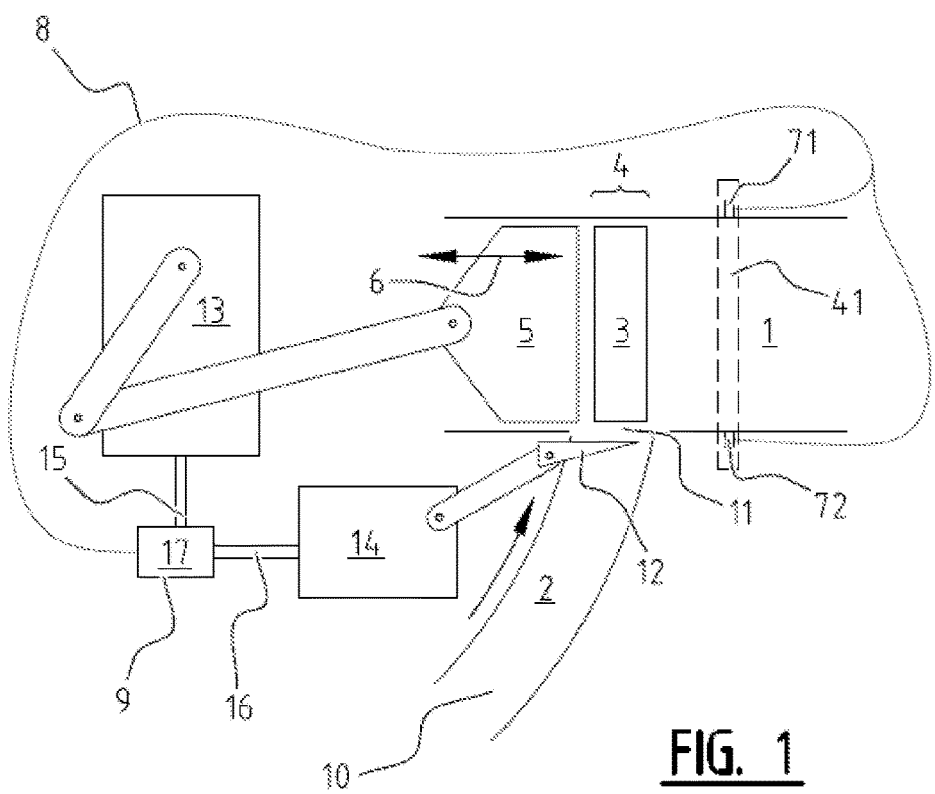
FIG. 1 shows a schematic representation of a baling chamber and pre-compression chamber.

FIG. 1 shows a schematic representation of main inside elements of an agricultural baler. The FIG. 1 shows a baling chamber 1 and a pre-compression chamber 2. The pre-compression chamber opens in the baling chamber to push a slice of crop material 3 in a first segment 4 of the baling chamber 1.

The baling chamber comprises a plunger 5 which is provided for reciprocally moving in the baling chamber. The reciprocal movement is indicated by arrow 6. To this end, the plunger 5 is driven by a plunger driving mechanism 13. The connection between the plunger driving mechanism 13 and the plunger 5 is schematically represented by a pair of arms, however other driving mechanisms can be used as well for driving the plunger 5 in the reciprocal movement 6.

The pre-compression chamber 2 comprises a slice pushing mechanism 12. The slice pushing mechanism 12 is driven by a slice pushing driving mechanism 14. Preferably, the slice pushing driving mechanism 14 is mechanically connected to the plunger driving mechanism 13. Such mechanical connection ensures a synchronized movement between the plunger 5 and the slice pushing mechanism 12.

It will be clear that synchronization between the slice pushing mechanism 12 of the pre-compression chamber and the reciprocal movement 6 of the plunger 5 is important for a correct operation of the baler. In the reciprocal movement of the plunger 5, the plunger moves over at least a part of the first segment 4 of the baling chamber 1. Therefore, for being able to push a slice of crop material 3 into the baling chamber 1, the plunger 5 is preferably somewhere in a withdrawn position in the reciprocal movement. Otherwise the first segment 4 is not open for receiving a slice of crop material 3.

The pre-compression chamber preferably comprises an inlet 10 and an outlet 11. The outlet 11 opens toward the first segment 4 of the baling chamber 1, so that a slice of crop material 3 formed in the pre-compression chamber 2 can be pushed through the outlet 11 into the baling chamber 1. The inlet 10 of the pre-compression chamber 2 is preferably connected to crop gathering means (not shown) provided for gathering crop material and pushing the gathered crop material into the pre-compression chamber 2 via the inlet 10.

The mechanical connection between the plunger driving mechanism 13 and the slice pushing driving mechanism 14 is schematically represented by the elements 15, 16 and 17 in FIG. 1.

Figure 2:
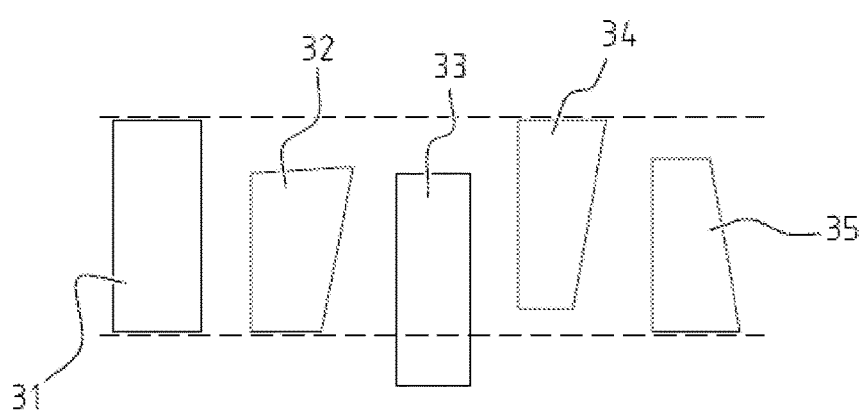
FIG. 2 shows some top-fill possibilities.

An important aspect in the formation of a nice square bale via the agricultural baler, is the top fill. FIG. 2 illustrates some possibilities regarding top fill. Top fill is defined as the distribution of crop material over the first segment 4 area at the moment that the plunger hits the slice of crop material in its forward movement. In an ideal situation, as is illustrated by slice 31, the crop material is evenly distributed over the complete area of the first segment 4 of the baling chamber 1. However, this ideal situation cannot always be achieved. At lower baling speed, it is possible that a slice of crop material 3 that is formed in the pre-compression chamber 2 has a density that is too low to keep the slice 3 in shape. The effect is that the slice of crop material shrinks in the first segment 4 of the baling chamber 1, thereby resulting in a slice as is shown in FIG. 2 with reference number 32 or reference number 35. Pressing a bale with slices formed like that, results in an uneven distribution of load to the plunger and results in bales having shapes that deviate from the ideal rectangular shape. In another case, a wrong synchronization between the slice pushing mechanism and the plunger could result in a slice that is not yet completely pushed in the first segment of the baling chamber when the plunger hits the slice, or has already fallen back (due to gravity) because the slice pushing mechanism withdrew too early. In such situation, a slice as is shown in FIG. 2 by reference number 33 is compressed by the plunger. Compressing such a slice again results in the above described problems. In fast working balers, another problem might arise where the slice pushing mechanism pushes the slice in the first segment of the baling chamber with such force that the slice deforms because it bumps into the top wall of the baling chamber 1. Such situation results in a slice as is shown in FIG. 2 with reference number 34. Again, such slice results in excessive wear of the baler elements because of unbalanced load, and results in bad bales.

FIG. 1 shows a first sensor 71 and a second sensor 72 that are placed in further segment 41 of the baling chamber 1. The sensors 71 and 72 are adapted to measure the speed of the bale which is pushed forward in the baling chamber 1. The first sensor 71 is provided in an upper region of the baling chamber 1 while the second sensor 72 is provided in a lower region of the baling chamber 1. In this manner, a speed difference between upper and lower region can be determined by the sensors 71 and 72. Such speed difference is indicative for a difference in bale density, which at its turn is an indication of a deviating top fill.

The bale speed sensors can be formed in different manners, for example as a star wheel sensor. Using a star wheel sensor, the rotation speed of the star wheel is directly proportional to the moving speed of the bale. A star wheel can be mounted in a fixed position with respect to the baling chamber, or can be suspended such that the star wheel is pushed towards the bale. For enhancing the comparability of the sensor results (the top fill being determined based on a difference in speed, thus the sensor outputs are compared), the first sensor 71 and the second sensor 72 are preferably mounted with respect to the baling chamber and with respect to the bale moving inside the baling chamber in the same manner. This means a same sensor (for example a star wheel having a predetermined diameter) and mounted in the same way (for example both mounted in a fixed position with respect to the baling chamber).

The advantage of using a star wheel sensor which is suspended towards the bale is that besides the speed of the bale, also the density of the bale is directly derivable from the sensor. The star wheel will penetrate a not-so-dense bale more than a more-dense bale. Therefore the position of a suspendedly mounted star wheel is indicative for the density of the bale. This position can be measured and be sent along with the rotation speed information as sensor output to the controller.

Alternatively, the bale speed sensors are formed as resistance sensor, ultrasonic sensor, optical speed sensor or other known sensor for measuring the speed of an object.

The first and second sensors 71, 72 are operationally coupled 8 to a controller 9. The controller 9 is adapted to adjust synchronization between the reciprocal plunger movement 6 and the slice pushing movement of the pre-compression chamber 2. In the example of FIG. 1, a mechanical connection is established between plunger driving mechanism and the slice pushing driving mechanism 14 via respective plunger shaft 15 and slice pushing mechanism shaft 16 which are connected via a gearbox 17. The gearbox 17 is adapted for adjusting the rotation ratio between the plunger axis 15 and the slice pushing mechanism axis 16, thereby adjusting synchronization between reciprocal plunger movement 6 and the slice pushing movement of the pre-compression chamber 2. The controller 9 is adapted to control the gearbox 17 based on the outputs of the sensors 71 and 72, particularly based on the difference in output of the sensors 71 and 72, which difference indicates a top fill deviation.

Figure 4:
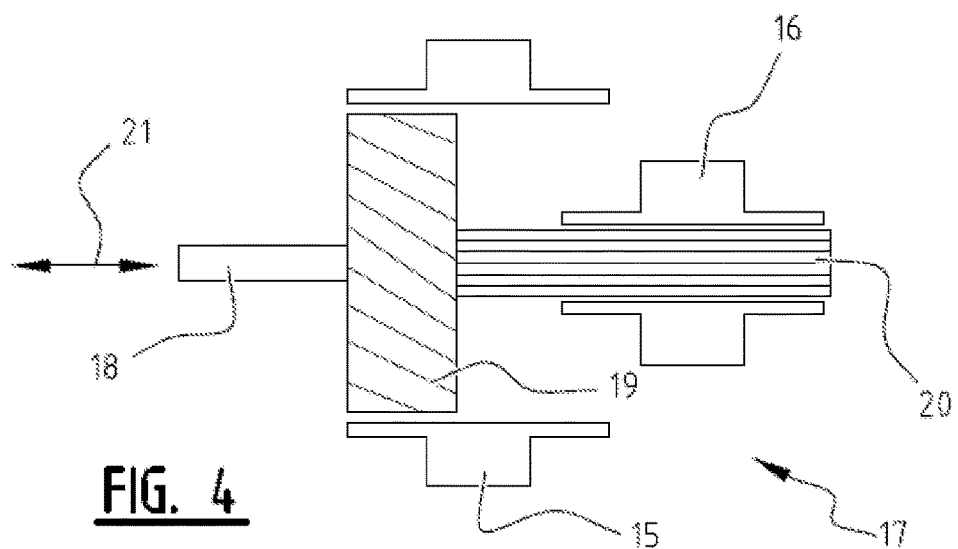
FIG. 4 shows a gearbox suitable for coupling the baling chamber movement and the pre-compression chamber movement.

FIG. 4 shows an example of a gearbox 17 that is suitable for adjusting synchronization between a first and a second rotating shaft. The gearbox 17 comprises helical input gear 15 and a straight output gear 16. In the example of FIG. 4 and FIG. 1, the helical input gear 15 is coupled to the plunger shaft 15 and the straight output gear 16 is coupled to the slice pushing mechanism shaft 16. The input gear 15 and output gear 16 are connected via an intermediary gear 18 showing two parts. A first part comprises a helical gear 19 complementary to the helical input gear 15, and the second part shows a straight gear 20 complementary with the straight output gear 16. Thereby, in a fixed position, the intermediary gear transmits the rotation of the input shaft connected to the input gear 15 directly in a one-to-one ratio to the output shaft connected to the output gear 16. The first part 19 and the second part 20 of the intermediary gear are preferably integrally formed in such a matter that one end of the intermediary gear comprises the helical gear and the opposite end comprises the straight gear 20. The helical gear and the straight gear are formed around a single longitudinal axis of the intermediary gear element. Preferably the helical gear diameter is larger than the straight gear diameter. More preferably, the helical gear diameter is larger than two times the straight gear diameter. The intermediary gear element is provided to move along its longitudinal axis between a first and a second position. In FIG. 4, the intermediary gear element is shown in its most leftward position, and can be shifted to the right. By moving the intermediary gear element along its longitudinal axis, the relative position of the input gear 15 and the output gear 16 changes. Thereby, synchronization between the input gear 15 and output gear 16 respectively coupled to the plunger driving mechanism and the slice pushing driving mechanism, can be amended and fine-tuned while maintaining an overall synchronization (as the shafts are mechanically coupled). Such fine-tuning is achieved by moving the intermediary gear element 18 along its longitudinal axis. Such movement is indicated in FIG. 4 by reference number 21.

Alternatively to a gearbox as shown in FIG. 4, a planetary gearbox (not shown) can be used to adjust synchronization between the plunger shaft 15 and the slice pushing driving mechanism shaft 16. A planetary gearbox is known for connecting three shafts. The center wheel, the ring wheel and the planetary wheels form the shaft connecting element. Thereby, the plunger shaft 15 and slice pushing driving mechanism 16 can each be connected to one of the three gear elements of the planetary gearbox. A controller can be connected to the third gear of the planetary gearbox. The gearbox can be so configured that a standing still controller results in a ratio between input axis and output axis (in the present case the plunger shaft 15 and slice pushing driving mechanism shaft 16) that is fixed and predetermined so that synchronization is achieved. A rotation of the controller, rotating the third gear of the planetary gearbox, amends the relative position of the input shaft and output shaft, thereby adjusting the synchronization. A skilled person, given the information above, can configure a planetary gearbox in different manners to serve the purpose of the present invention.

By adjusting synchronization between the reciprocal plunger movement 6 and the slice pushing movement of the slice pushing mechanism 12, the timing of insertion of a slice 3 with respect to the plunger movement 6 can be adjusted and thereby optimized. Also the speed of pushing the slice into the first segment of the baling chamber can be adjusted and optimized. By controlling the speed and timing, the top fill can be influenced and optimized. Thereby, a top fill as illustrated in FIG. 2 with reference number 31 can be obtained by adjusting the synchronization.

Figure 5:
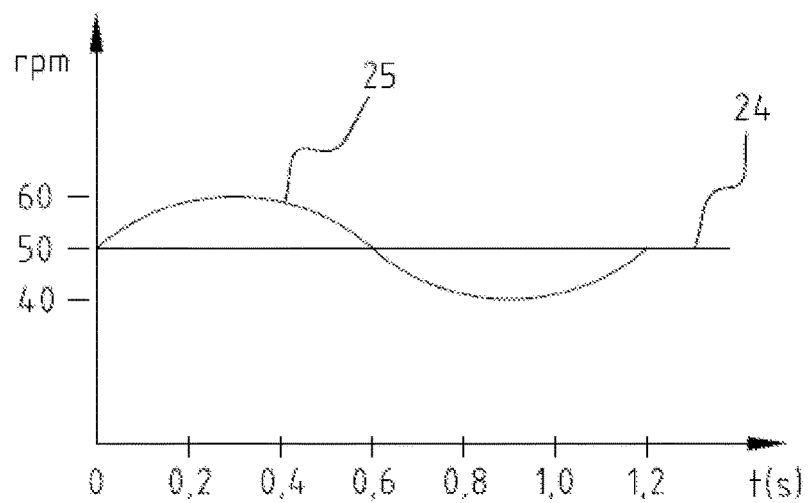
FIG. 5 shows the influence of the gearbox in the movement of the pre-compression chamber elements.
Figure 5:
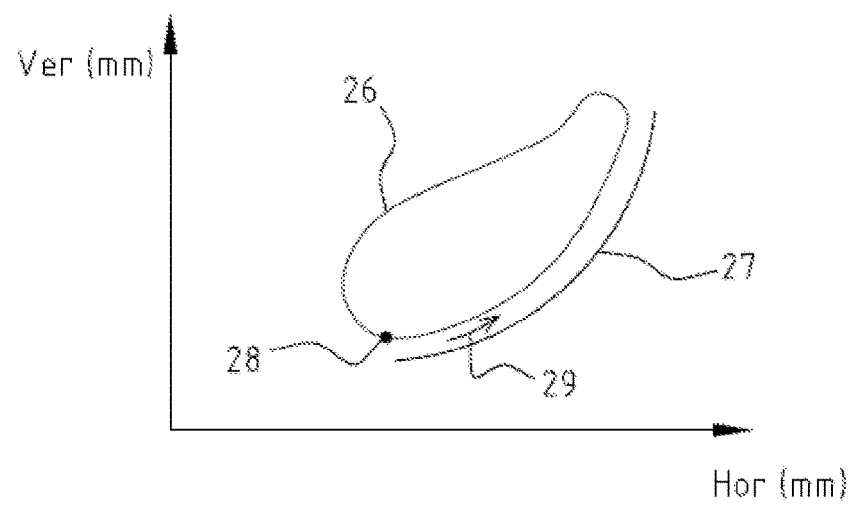

FIG. 5 shows two graphical representations of the slice pushing movement. The lower graph shows the movement that the slice pushing mechanism tip makes in time, and shows on the horizontal axis the horizontal movement in millimeters and on the vertical axis the vertical movement in millimeters. Starting at point 28, the tip is displaced in the direction indicated by arrow 29 and grasps behind the slice to push the slice through the outlet into the baling chamber. The pushing movement is indicated by reference number 27. In the rest of the movement 26, the tip withdraws, and in the withdrawn position, moves back to the starting point 28 where the tip can push a new slice in a subsequent period. The upper part of FIG. 5 shows the transmission of rotational movement between the plunger shaft and the slice pushing mechanism shaft over the time. In the figure, as an example, the slice pushing period takes 1.2 seconds, meaning that every 1.2 second a new slice of crop material is pushed into the baling chamber. Using a fixed connection between the plunger shaft 15 and the slice pushing mechanism shaft 16, a rotation is transmitted from one to the other shaft in a flat manner as is indicated by reference number 24. This route results in a slice pushing mechanism tip moving along the path 26 with a constant speed (constant speed meaning that every period, in every sub-segment of the movement, the tip follows the path with an identical distance over time ratio). Thereby, the speed of the segment 27 of the path of movement 26 cannot be adjusted. Using a gearbox as described above to connect the plunger shaft and the slice pushing driving mechanism shaft, the synchronization can be adjusted. An example of an adjusted synchronization is indicated with reference number 25. In this example, the first part of the period is speeded up with respect to the second part of the period. Thereby, the slice pushing mechanism tip moves faster over the segment 27 of the movement path 26 than over the rest of the movement path. As a result, the timing of arrival of the slice 3 in the first segment 4 of the baling chamber 1 is adjusted.

Preferably the gearbox 17 comprises an actuator that is steerable via the controller 9. The controller 9 is operationally connected to first and second bale speed sensor 71 and 72. The actuator is preferably coupled to the gearbox in such a manner that the relative position of the plunger shaft with respect to the slice pushing mechanism shaft is adjustable. In the example of the gearbox of FIG. 4, the actuator is coupled to the intermediary gear element to move the intermediary gear element along it longitudinal axis. In the example of the planetary gearbox, the actuator is coupled to the third of the three gear elements, so that a rotation of the actuator changes the relative position of the plunger shaft (connected to a first of the three gear elements) and the slice pushing mechanism shaft (connected to a second of the three gear elements). The actuator is steerable by the controller, which thereby controls the relative position of the plunger shaft 15 with respect to the slice pushing mechanism shaft 16.

The controller comprises an electrical circuit or an electronic circuit or a programmable electronic circuit or a combination of the above, so that the connector can control the actuator based on the input received via the first and second bale speed sensors 71, 72. The controller can comprise an open control loop, or a closed control loop, or a control loop comprising feed forward control commands, or a combination of the above. Preferably the controller comprises a comparator which is adapted to compare the first bale speed sensor 71 output with the second bale speed sensor 72 output in order to determine a difference. This difference is indicative for a difference in bale density over the height of the bale, which at its turn is indicative of a deviating top fill. The output of the comparator is preferably used by the controller to control the actuator.

Figure 3:
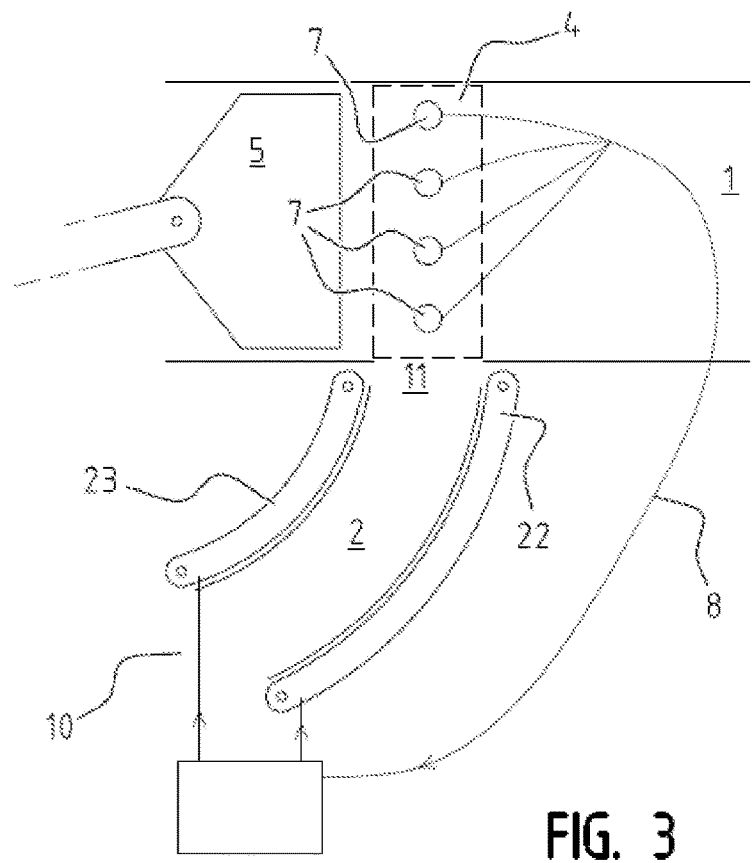
FIG. 3 shows an alternative schematic representation of a baling chamber and pre-compression chamber.

FIG. 3 shows an alternative configuration of a baling chamber 1 and a pre-compression chamber 2. In the example of FIG. 3, multiple bale speed sensors are provided in the segment 4 of the baling chamber 1, each of the sensors being mounted at a different height in the segment 4 of the baling chamber 1. The bale seed sensors 7 are preferably mounted in at least one of the side walls of the baling chamber 1. Having multiple sensors at different heights in the first segment 4 of the baling chamber 1 allows to deduce not only a difference in bale speed and density between two points in the bale, but allows to obtain a deviation pattern of bale density/speed over the height of the bale. Such deviation pattern makes it possible to interpret the top fill deviation in more details. For example, such deviation pattern makes it possible to distinguish top fill 32 from top fill 35 whereas a measurement with only two sensors (as shown in FIG. 1) would not significantly show a difference. The deviation pattern can be further used by the controller 9 to adjust the synchronization between the reciprocal movement of the plunger and the slice pushing of the pre-compression chamber 2.

FIG. 3 also shows an alternative configuration of the pre-compression chamber 2. In the example of FIG. 3, the pre-compression chamber is defined by two belt conveyers 22, 23 forming a channel between an inlet 10 and an outlet 11. The outlet 11 opens into the baling chamber 1. The inlet 10 is connected to crop gather means which are provided to introduce crop material into the channel defined by the belt conveyers 22 and 23. In such configuration, in the slice forming process, the belt conveyers 22, 23 rotate at a first (low) speed. Once the slice is formed, the belt conveyers 22, 23 accelerate to a second (high) speed thereby throwing the formed slice through the outlet 11 into the first segment 4 of the baling chamber 1. The second speed is higher than the first speed. The belt conveyers 22, 23 are driven by electric or hydraulic engines. These engines can be coupled to one another (for synchronization) or can be driven independently. These engines can be coupled to the plunger driving mechanism for synchronization or can be independent from the plunger driving mechanism. The controller 9 is provided to control the engines driving the belt conveyers 22, 23 so that the top fill is adjustable.

It will be clear that different combination can be made of baler elements which examples are given in the present description. Also alternative gearboxes could be developed, beside the gearboxes described above which allow to adjust synchronization. Therefore, it is emphasized that the examples described and the figures shown in support of the description are not intended to limit the invention. The scope of the invention shall be solely defined in the claims.

In the above description, different embodiments have been described that allow to adjust the top fill occurring in the first segment 4 of the baling chamber. By adjusting the top fill, referring back to FIG. 2, situations as indicated by reference number 33 can be avoided. Furthermore, deduction of the ideally shaped 31 slice (deduction such as indicated with reference number 32, 34 and 35) can be minimized. Adjusting the synchronization between the reciprocal plunger movement 6 and the slice pushing movement of the pre-compression chamber 2 implies that at least one of the slice pushing speed and slice pushing timing is controllable and can be amended.

In the present description, crop gathering means or crop gathering mechanism or feeder for feeding crop material refer to the same or at least similar part of the baler.

The invention claimed is:
1. An agricultural baler comprising:
   a baling chamber and a pre-compression chamber,
   the baling chamber comprising a plunger provided for moving in the baling chamber,
   wherein the baling chamber further comprises a first segment located directly behind the plunger when the plunger is in a withdrawn position, and an outlet of the pre-compression chamber opens towards said first segment wherein the pre-compression chamber is configured to receive crop material and to periodically form a slice of said crop material and push the slice towards the baling chamber into a first segment of the baling chamber, wherein a first and a second bale speed sensor are provided in the baling chamber downstream of the first segment of the baling chamber, the first sensor at an upper part and the second sensor at a lower part of the baling chamber, the first and second bale speed sensors outputting a speed of the slice moved by the plunger in the baling chamber, respective outputs of said bale speed sensors being operationally connected to a controller which is configured to adjust based on said outputs a synchronization between the periodically forming and pushing of the slice and reciprocal movement of the plunger.

2. The agricultural baler of claim 1, wherein the controller is adapted to adjust a synchronization timing of the periodically forming and pushing of the pre-compression chamber with respect to the reciprocal movement of the plunger.

3. The agricultural baler of claim 1, wherein the first and second bale speed sensor are mounted in a further segment, different from the first segment.

4. The agricultural baler of claim 3, wherein the further segment has a width smaller than 30 cm.

5. The agricultural baler according to claim 1, wherein the first and second bale speed sensor are mounted in the baling chamber at the same distance from the plunger.

6. The agricultural baler according to claim 1, wherein the first and second bale speed sensors are chosen from star wheel sensors, resistance sensors, ultrasonic sensors and optical sensors.

7. The agricultural baler according to claim 1, further comprising a feeder for feeding crop material into an inlet of the pre-compression chamber, wherein an outlet of the pre-compression chamber opens towards said first segment, said pre-compression chamber further comprising a pushing mechanism for pushing said slice through said outlet into the baling chamber, whereby said controller is provided for controlling the timing of said pushing mechanism.

8. The agricultural baler according to claim 7, wherein the pre-compression chamber further comprises two conveyors defining a channel between the inlet and the outlet, the two conveyors being provided to form said slice and to act as said pushing mechanism.

9. The agricultural baler according to claim 7, wherein said pushing mechanism is formed as a set of fingers provided for grasping behind the slice of crop material at the inlet of the pre-compression chamber and for pushing the slice through the outlet by moving the fingers towards the outlet.

10. The agricultural baler according to claim 1, wherein a plunger driving mechanism is mechanically connected to a slice pushing driving mechanism to synchronize the latter, the mechanical connection comprising an intermediary coupling element steerable via said controller.

11. The agricultural baler according to claim 10, wherein said intermediary coupling element is formed as a planetary gearbox.

12. The agricultural baler according to claim 10, wherein said intermediary coupling element is formed as a two part gearbox, the first part connecting one end via a straight gear coupling, the second part connecting the other end via a helical gear coupling.

13. The agricultural baler according to claim 10, wherein the intermediary coupling element is adapted to adjust the relative position of the plunger driving mechanism and the slice pushing driving mechanism.

14. The agricultural baler according to claim 10, wherein an actuator is connected to said intermediary coupling element.

15. The agricultural baler according to claim 1, wherein at least one further bale speed sensor is provided in the baling chamber, an output of the at least one further bale speed sensor is operationally connected to said controller.

16. The agricultural baler according to claim 15, wherein the at least one further bale speed sensor is mounted in the baling chamber at the same distance from the plunger as the first and second sensor.

* * * * *